United States Patent
Youngblood et al.

(10) Patent No.: US 10,899,922 B2
(45) Date of Patent: Jan. 26, 2021

(54) EPOXY TANNIN REACTION PRODUCT COMPOSITIONS

(71) Applicant: Purdue Research Foundation, West Lafayette, IN (US)

(72) Inventors: Jeffrey Paul Youngblood, West Lafayette, IN (US); John A. Howarter, West Lafayette, IN (US); Matthew N. Korey, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 6 days.

(21) Appl. No.: 16/486,877

(22) PCT Filed: Feb. 27, 2018

(86) PCT No.: PCT/US2018/019837
§ 371 (c)(1),
(2) Date: Aug. 19, 2019

(87) PCT Pub. No.: WO2018/160520
PCT Pub. Date: Sep. 7, 2018

(65) Prior Publication Data
US 2020/0010664 A1 Jan. 9, 2020

Related U.S. Application Data

(60) Provisional application No. 62/465,485, filed on Mar. 1, 2017.

(51) Int. Cl.
*C08L 63/00* (2006.01)
*C08G 59/24* (2006.01)
*C08L 97/02* (2006.01)
*C08K 5/00* (2006.01)

(52) U.S. Cl.
CPC ............ *C08L 63/00* (2013.01); *C08G 59/245* (2013.01); *C08L 97/02* (2013.01); *C08K 5/0025* (2013.01)

(58) Field of Classification Search
None
See application file for complete search history.

(56) References Cited

U.S. PATENT DOCUMENTS

| 4,435,529 | A  | * | 3/1984 | Kaylo ..................... C08L 63/00 523/410 |
| 4,540,802 | A  | * | 9/1985 | Tomita ................. C07D 303/24 549/515 |
| 2010/0148380 | A1 | * | 6/2010 | Hayashi ................. C08G 59/42 257/793 |
| 2012/0022185 | A1 | * | 1/2012 | Elgimiabi ............... C08L 63/00 523/451 |
| 2020/0010664 | A1 | * | 1/2020 | Youngblood ........ C08G 59/245 |

OTHER PUBLICATIONS

Efficient Toughening of Epoxy-Anhydride Thermosets with a Biobased Tannic Acid Derivative, Fei et al., ACS Sustainable Chem. Eng., Published Oct. 24, 2016, 5, 596-603. (Year: 2016).*
PCT/US2018019837 International Search Report and Written Opinion of the International Search Authority, dated Apr. 20, 2018.
Fei, Xiaoma, et al., Tannic acid as a bio-based modifier of epoxy/anhydride thermosets. Polymers 2016, 8, 314.
Chemical Book: Curing agent for epoxy resins, pp. 1-2, 2016; retrieved from the Internet: <URL: https://www.chemicalbook.com/Supplyinfo_184784.htm>; p. 1.
European Search Report, dated Oct. 20, 2020.
Shibata M. et al., "Preparation and properties of biocomposites composed of bio-based epoxy resin, tannic acid, and microfibrillated cellulose : Preparation and Properties of Biocomposites", Journal of Polymer Science Part B: Polymer Physics, vol. 48, No. 4, Jan. 12, 2010, pp. 425-433.
Jahanshahi S. et al., "MALDI-TOF, 13C NMR and FT-MIR analysis and strength characterization of glycidyl ether tannin epoxy resins", Industrial Crops and Products, Elsevier, NL, vol. 83, Jan. 6, 2016, pp. 177-185.

* cited by examiner

*Primary Examiner* — Peter A Salamon
(74) *Attorney, Agent, or Firm* — Purdue Research Foundation; Zhigang Rao

(57) ABSTRACT

The present application generally relates to epoxy/tannin reaction product compositions, and methods of making and using the epoxy tannin reaction product compositions. The epoxy/tannin reaction product compositions are hardened thermosetting polymeric materials, are substantially homogeneous and substantially free of visible clumps, and have a glass transition temperature of at least 140° C.

12 Claims, No Drawings

EPOXY TANNIN REACTION PRODUCT COMPOSITIONS

CROSS-REFERENCE TO RELATED APPLICATION

This application claims priority to, and is a U.S. § 371 national stage entry of, International Patent Application Serial No. PCT/US2018/019837 filed Feb. 27, 2018, which is related to and claims the benefit of U.S. Provisional Patent Application Ser. No. 62/465,485, filed Mar. 1, 2017, each of which is incorporated herein by reference in its entirety.

GOVERNMENT RIGHT

This invention was made with government support under 1144843-DGE awarded by National Science Foundation's Integrative Graduate Education and Research Traineeship (NSF IGERT). The government has certain rights in the invention.

TECHNICAL FIELD

The present application generally relates to epoxy tannin reaction product compositions, and methods of making and using the epoxy tannin reaction product compositions.

BACKGROUND

This section introduces aspects that may help facilitate a better understanding of the disclosure. Accordingly, these statements are to be read in this light and are not to be understood as admissions about what is or is not prior art.

Because of their excellent performance properties, good processability and low cost, epoxy resins are used as one of the most versatile thermosetting polymers with a wide range of applications including coatings, adhesives, structural composites and electronic materials. However, their inherent brittle nature because of high degree of chemical crosslinking severely limits their uses in many applications.

In recent years, the fast depletion of petroleum reserve and increasing environmental problems have led to a growing interest in the use of bio-based sustainable feedstock in the synthesis of bio-based chemicals and products. In this regard, many effort have been focused on the synthesis and utilization of renewable material as efficient epoxy modifier. However, toughening an epoxy resin by bio-based modifiers without trade-offs in its modulus, mechanical strength, and other properties is still a big challenge.

Tannins such as tannic acid (TA) are water-soluble high molecular weight polyphenolic compounds, mostly extracted from plants and microorganisms. Tannins generally have molecular weight between 500 to 3000 Daltons. TA has a macromolecular structure composed of gallic acid units and abundant terminal phenolic hydroxyl groups. Owing to such a structure with polyphenolic hydroxyl groups, tannins such as TA shows remarkable properties and are widely used in many applications, such as coatings, adsorption and antibacterial materials, separator for lithium-ion batteries, and nanomaterials.

However, because of intermolecular hydrogen bonds, Van der Waals interactions and stacking of aromatic groups, tannin such as TA is well-known to be immiscible with epoxy resin and tends to precipitation during curing.

SUMMARY

One of the primary objectives of the present disclosure is to provide a tannin/epoxy thermosetting polymeric composition that can be used as structural component. And it is unexpectedly found that tannin such as TA and epoxy system, although well-known as immiscible and tends to precipitation during curing, can become miscible with extended period of heating and then cure to make a substantially homogeneous TA/epoxy thermosetting polymeric composition substantially free of visible clumps.

In one embodiment, the present disclosure provides a thermosetting polymeric composition obtained by a reaction of a mixture comprising:
an epoxy material; and
a tannin,
wherein the thermosetting polymeric composition is a hardened polymeric material and is substantially homogenous,
wherein the weight percentage of tannin is 3-50%, the epoxy material is 50-97% of the total weight of the epoxy material and the tannin,
wherein the thermosetting polymeric composition has a glass transition temperature of at least 140° C.

In one embodiment, the present disclosure provides a method of preparing the thermosetting polymeric composition of the present disclosure, wherein the method comprising:
a) heating the epoxy material and the tannin at a temperature between 100-180° C. until a substantially homogeneous solution is obtained; and
b) curing the substantially homogeneous solution between 130-180° C. until the solution is hardened.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "substantially homogeneous" or "homogeneous" means that the cured thermosetting polymeric composition of tannin/epoxy has very limited number of or no visible (viewed by human eyes) clumps.

The novel compositions of the invention can be prepared by reacting an epoxy material and a tannin, as is set forth, more fully, herein.

The epoxy material may be of a resin class containing at least one 1,2-epoxy group. The resin may be, for example, among the general classes commonly referred to as polyethers, polyesters, acrylic, urethane, and the like, which contain the 1,2-epoxy group. Although monoepoxides such as phenyl glycidyl ether, n-butyl glycidyl ether and the like can be utilized, it is preferred that the epoxy material contain more than one 1,2-epoxy group per molecule, as such, it is a polyepoxide.

Particularly preferred polyepoxides are polyglycidyl ethers of cyclic polyols, particularly polyphenols such as Diglycidylether Bisphenol A (DGEBA). These polyepoxides may be produced by etherification of a cyclic polyol with epichlorohydrin or dichlorohydrin in the presence of alkali.

Examples of cyclic polyols are bis(4-hydroxyphenyl)-2,2-propane, 4,4'-dihydroxybenzophenone, bis(4-hydroxyphenyl)-1,1-isobutane, bis(4-hydroxytertiarybutylphenyl)-2,2-propane, bis(2-hydroxynaphthyl)methane, 1,5-hydroxynaphthalene or the like. Also, polyepoxides similarly produced from epichlorohydrin and novolak-type phenol resins may be employed.

In preparing the novel compositions, the tannin is reacted with the epoxy material in an amount to produce a compatible and substantially homogeneous epoxy-tannin reaction product. In the present disclosure, the tannin is reacted with the polyepoxides in a weight percentage ranging from about 3% to 50% by weight, 5% to 45% by weight, 10 to 40% by weight, 10 to 35% by weight, and about 20-40% by weight, based on the total weight of the tannin and the polyepoxide. As would be realized, the amount in which the tannin is reacted with the epoxy material would vary from the aforestated amount, in instances when monoepoxides are reacted therewith, preferably in conjunction with the polyepoxides.

Of the class tannins useful, herein tannic acid is, presently, the most preferred member. Tannic acid is a lustrous, faintly yellowish, amorphous powder occurring as glistening scales or spongy mass. Other tannins which are envisaged as being useful in the present disclosure (as well as the tannic acid) are extracted from plants and are, generally, named to correspond with the source of extraction, for example, a tannin derived from oak tree is named oak tannin. They are classified as hydrolyzed and condensed tannins. A detailed description of the tannins is provided by Kirk-Othmer Encyclopedia of Chemical Technology, (1954), Vol. 13, pages 578-599.

In one embodiment of the present disclosure, the term "tannin" by extension is widely applied to any large polyphenolic compound containing sufficient hydroxyls and other suitable groups (such as carboxyls) to form strong complexes with various macromolecules. Tannin may also refer to any tannin derivatives such as esters, amides, ethers, carboxylic acids that derive from the natural products or the modification of the naturally obtained tannin materials.

In one embodiment, a tannin in the present disclosure refers to any material that has a structure composed of gallic acid unit and terminal phenolic hydroxyl group.

In one embodiment, a tannin in the present disclosure refers to any material that has terminal phenolic hydroxyl groups, and the material has a molecular weight between 500-3000 Daltons.

Although TA/epoxy may form compatible mixture when certain organic solvent such as methyl ethyl ketone (MEK) is involved, the materials made with organic has disadvantages. For example, organic solvents may impede mechanical properties and crosslinking of the polymers, therefore lead to lower quality of the formed polymers.

The reaction condition A for the preparation of the novel tannin/epoxy thermosetting hardened polymer is as following.

An appropriate amount of tannin such as TA is added to an epoxy material such as Diglycidylether Bisphenol A (DGEBA). The mixture may not compatible or immiscible at the room temperature or even under elevated temperature for a limited period of time such as 1-2 hours. Continue heating the mixture between 100-180° C. for about 3-8 hours or longer, depending on the ratios of TA and epoxy materials, a substantially homogeneous mixture may be obtained. The liquid homogeneous mixture may be cured at a temperature ranging from 130-180° C. to form a hardened, substantially homogeneous thermosetting polymer. Examples A-D are prepared by using tannic acid (TA) and Diglycidylether Bisphenol A (DGEBA) as the reactants at different ratios. The glass transition temperatures of the mean thermal degradation data of each examples are provided in Table 1.

TABLE 1

Glass Transition Temperatures ($T_g$) and Mean Thermal Degradation ($T_d$) of the control (DGEBA and TETA) material and Examples A-D.

| Examples (TA:DGEBA, molar ratios of the functional epoxy ring on the resin to the phenol groups on TA) (wt % of TA of the total weight of the reaction mixture) | Mean Tg (° C.) | Mean Thermal Degradation (° C.) |
|---|---|---|
| Control (DGEBA and TETA) | 110-115 | 362 |
| A. 2:1 (16.7% wt of TA) | 125 | 325 and 440 |
| B. 1.5:1 (21.0 wt % of TA) | 150 | 425 |
| C. 1:1 (28.6 wt % of TA) | 170 | 424 |
| D. 1:1.5 (37.4 wt % of TA) | 175 | 427 |

The reaction condition B for the preparation of the novel tannin/epoxy thermosetting hardened polymer is as following.

Materials: TA was purchased from Sigma Aldrich (St. Louis, Mo., USA). EPON 825 (DGEBA) resin was purchased from Hexion, Inc. (Louisville, Ky., USA). Mold Max 60 silicone precursor and initiator—parts A and B—were purchased from Smooth-On, Inc. (Macungie, Pa., USA). 20 mL borosilicate scintillation vials were purchased from Thermo Fisher Scientific (Waltham, Mass., USA). Rubber septa were purchased from Thomas Scientific, Inc. (Swedesboro, N.J., USA). 18 gauge needles were purchased from Becton Dickinson (Plainfield, Ind., USA).

Thermogravimetric analysis (TGA) for thermal degradation temperatures was performed with a Q50 thermogravimetric analyser (TA Instruments, Newcastle, Del., USA). Samples were prepared for TGA analysis by shaving off 20±1.3 mg of sample from epoxy bars. Experiments were performed in nitrogen with a 50 mL/min flowrate using a 20° C./min ramp rate from 30° C. to 800° C. Three epoxy samples were run at each concentration and results were averaged. $T_d$ was determined by finding the peak of the mass loss rate curve using Universal Analysis (TA Instruments, Newcastle, Del., USA) and averaging the temperature values at this point. Remaining char values were calculated by measuring the weight fraction of the sample using Universal Analysis (TA Instruments, Newcastle, Del., USA) at the completion of the TGA test (800° C.) and then averaging the weight fraction values at this point.

Differential Scanning calorimetry (DSC) for glass transition temperatures was performed on shavings of the epoxy samples using a Q2000 Differential Scanning calorimeter (TA Instruments, Newcastle, Del., USA). Samples of 12±1.2 mg were loaded into aluminum pans and run using a heat/cool/heat cycle from −75° C. to 200° C. with a heating and cooling rate of 25° C. per minute. Three samples were run at each concentration and the mean glass transition value of the second heat curve was measured as the midpoint of the incline observed on thermograms and averaged for each concentration using Universal Analysis (TA Instruments, Newcastle, Del., USA).

Dynamic Mechanical Analysis (DMA) was performed to measure storage modulus (E') on all samples using Q800 Dynamic Mechanical Analyzer (TA Instruments, Newcastle, Del., USA). Samples were prepared of dimensions 5.5 cm×1.2 cm×0.35 cm by pouring prepared solutions into silicone molds and then cured. Samples were polished to remove remaining silicone from their surfaces. A dual cantilever mechanical test was performed at a frequency of 1 Hz and displacement of 0.15 μm. Temperature was increased at a rate of 15° C. per minute from 30° C. to 250° C. Initial E' was calculated by averaging the E' values for samples at 45° C. Three samples were run at each TA concentration and were averaged. $T_g$ values were calculated by measuring the temperature of the peak of the tan(δ) curve using Universal Analysis (TA Instruments, Newcastle, Del., USA).

Statistical analysis was performed using JMP (SAS Institute, Cary, N.C., USA). A student's t-test was run to compare samples to control samples as well as other weight percent samples. A p-value<0.05 was used to indicate statistically significant differences between samples. Regression analysis was performed using OriginPro 2017 (OriginLab Inc., Northampton, Mass., USA). Results were fit to an exponential decay and linear models, and the reported equations and standard error ($S_e$) values were output by the software after regression analysis. $S_e$ values<0.05 were determined as appropriate fits for the regression.

B-1. Prepare a silicone mold: The silicone molds were prepared according to the method disclosed in Mendis et al. G. Mendis, S. Weiss, M. Korey, C. Boardman, M. Dietenberger, J. Youngblood, J. Howarter, Phosphorylated Lignin as a Halogen-Free Flame Retardant Additive for Epoxy Composites, Green Materials 4(4) (2016). About 100 parts of silicone precursor were mixed with 3 parts by weight tin initiator for 2 minutes using a DAC 400 Speedmixer from (FlackTek Inc., Landrum, S.C., USA). A negative mold of polyethylene was purchased (TA Instruments, Newcastle, Del., USA) with required dimensions for analysis—5.5 cm×1.2 cm×0.35 cm—and this was secured to a glass base. About 700 g of mixed silicone was poured on top of this setup, and a weight was placed on top to ensure a level base for the silicone mold. Samples sat for 24 hours at room temperature to cure. The silicone mold was then removed from the apparatus and placed into an oven at 150° C. to heat for epoxy preparation.

B-1: Epoxy sample preparation: TA powder was sifted to remove clumps larger than 106 μm and then dried for 30 minutes in an oven at 100° C. to remove coordinated water molecules from the powder. The required weight of DGEBA was added to a scintillation vial and was heated to 60° C. in a sandbath for 15 minutes to reduce the viscosity of the solution and allow for better mixing. TA was added to DGEBA at various molar ratios of the gallol hydroxyl on TA and the epoxy ring (Table 1). The recorded molecular weight of TA (1701 g/mol) and the weight per epoxide of DGEBA (175 g/eq) were used for these calculations. TA/DGEBA composites were mixed in the sandbath at 60° C. for 15 minutes. During this time, samples were isolated from oxygen environment by sealing the reaction using a rubber septum. Nitrogen was fed into the scintillation vial using a needle which was attached to a nitrogen line and then pierced through the rubber septum. An additional needle was pierced through for outlet nitrogen gas and was left open to atmosphere. After mixing, the scintillation vial was removed and placed into a second sandbath at 150° C. and reconnected to the nitrogen line. The samples were allowed to heat to this temperature for 10 minutes. Once the TA/DGEBA composite solutions reached 150° C., the samples were mixed for 50 minutes until the solution browned and no visible clumps were observed. The silicone mold was heated to 150° C. in the oven before sample fabrication. TA/DGEBA composites were then poured into the hot silicone mold. The silicone mold, now containing the TA/DGEBA composite, was placed into an oven at 150° C., heated at a heating rate of 5° C. per minute until it reached 175° C. and then held for 4 hours. Samples were then removed from the oven and allowed to cool to room temperature overnight.

TABLE 2

Thermomechanical and thermal stability results for the TA/DGEBA composites. Samples denoted with "*" are significantly increased compared to Sample 0.5 ($p < 0.05$).

| Examples (TA:DGEBA, molar ratios of the functional epoxy ring on the resin to the phenol groups on TA) (wt % of TA of the total weight of the reaction mixture) | Mean $T_g$ (° C.) | Mean Thermal Degradation (° C.) | E' (GPa) |
|---|---|---|---|
| A-1. 2:1 (16.7% wt of TA) | 143 ± 11 | 308 ± 36 and 432 ± 11 | 1.947 ± .08 |
| B-1. 1.5:1 (21.0 wt % of TA) | 186 ± 6* | 424 ± 23* | 2.38 ± .06* |
| C-1. 1:1 (28.6 wt % of TA) | 199 ± 3* | 419 ± 23* | 3.03 ± 0.1* |
| D-1. 1:1.5 (37.4 wt % of TA) | 201 ± 4* | 428 ± 23* | 3.14 ± 0.06* |

In the modification of the reaction condition B, it was surprisingly found that the products obtained in the nitrogen protected reaction conditions provided much higher glass transition temperatures and thermal degradation temperatures. For corresponding Examples A, B, C, D as illustrated in Table 1, the products A-1, B-1, C-1, and D-1 in Table 2 prepared under nitrogen condition have mean glass transition temperatures of 143±11° C., 186±6° C., 199±3° C., and 201±4° C., respectively. The purpose if nitrogen reaction environment is to minimize the impact of the oxygen in the air atmosphere. Any other low oxygen or substantially oxygen free conditions may provide the similar results. For example, argon can be used to replace nitrogen. Since both tannin and DGEBA are oxygen rich materials, it was unexpected that the low oxygen or substantially oxygen free conditions may provide products that have significantly improved glass transition temperatures and thermal degradation temperatures.

The glass transition data is collected from DSC (differential scanning calorimetry) at a 10 degrees Celsius per minute ramp. The thermal degradation is collected from TGA (thermos gravimetric analysis) at a 10 degrees Celsius per minute ramp.

With the increase of the weight percentage of tannic acid increases, the mean glass transition temperature and the mean thermal degradation also increases. The results demonstrate the much improved thermal stability of the novel thermosetting polymers.

One advantage of the tannin/epoxy reaction product is that the tannin serves as an reactant and a hardening agent in the reaction. In general practice, an amine such as triethylene tetramine (TETA) is used as the hardening agent. The use of tannin as a biologically sourced hardener is additional environmental benefit.

One additional advantage of the tannin/epoxy reaction product is that the tannin serves as an reactant and also a crosslinking agent in the reaction. Tannin has been studied for use as a crosslinking agent for bio-based epoxy systems, but the resulting $T_g$s were below 100° C. even with additional chemical functionalization and curing at 200° C. Hydrophilic tannin has very limited compatibility in the hydrophobic epoxy resin even at elevated temperatures like 60° C. Therefore, the present disclosure surprisingly identified a novel reaction condition that provided the cross-linked epoxy materials by tannin and provided a novel reaction product that has a glass transition temperature of at least 140° C.

In one embodiment, tannin such as TA and epoxy material constitute 50-100% of the reaction product. In one embodiment, tannin such as TA and epoxy material constitute 60-100% of the reaction product. In one embodiment, tannin such as TA and epoxy material constitute 70-100% of the reaction product. In one embodiment, tannin such as TA and epoxy material constitute 80-100% of the reaction product. In one embodiment, tannin such as TA and epoxy material constitute 90-100% of the reaction product. In one embodiment, tannin such as TA and epoxy material constitute 95-100% of the reaction product. In one embodiment, TA and epoxy constitute 98-100% of the reaction product.

In one embodiment, the tannin such as TA and the epoxy material reaction product is organic solvent free or substantially organic solvent free.

A novel reaction product of a tannin such as TA and a epoxy material such as DGEBA as disclosed in the present disclosure provides significant thermal stability and increased glass transition temperature ($T_g$).

In one embodiment, the novel reaction product of a tannin such as TA and a epoxy material such as DGEBA as disclosed in the present disclosure has a glass transition temperature of at least 140° C., at least 150° C., at least 160° C., at least 170° C., at least 180° C., at least 190° C., or at least 200° C. In one aspect, the novel reaction product has a glass transition temperature of about 140-300° C., about 140-250° C., about 140-225° C., about 150-300° C., about 150-250° C., about 150-225° C., about 160-300° C., about 160-250° C., about 160-225° C., about 170-300° C., about 170-250° C., about 170-225° C., about 180-300° C., about 180-250° C., or about 180-225° C.

In one embodiment, the present disclosure provides a thermosetting polymeric composition obtained by a reaction of a mixture comprising:
  an epoxy material; and
  a tannin,
  wherein the weight percentage of tannin is 3-50%, the epoxy material is 50-97% of the total weight of the epoxy material and the tannin,
  wherein the thermosetting polymeric composition has a glass transition temperature of at least 140° C.

In one embodiment, the present disclosure provides a thermosetting polymeric composition obtained by a reaction of a mixture comprising an epoxy and a tannin, wherein the thermosetting polymeric composition is substantially free of visible clumps.

In one embodiment, the present disclosure provides a thermosetting polymeric composition obtained by a reaction of a mixture comprising an epoxy and a tannin, wherein the epoxy material is selected from the group consisting of epoxy-containing polyethers, epoxy-containing polyesters, epoxy-containing polyurethanes, epoxy-containing acrylics, and any combination thereof. In one aspect, the epoxy material comprises polyepoxide. In one aspect, the epoxy material comprises Diglycidylether Bisphenol A (DGEBA).

In one embodiment, the present disclosure provides a thermosetting polymeric composition obtained by a reaction of a mixture comprising an epoxy and a tannin, wherein the tannin has a structure comprises at least a gallic acid unit and at least one terminal phenolic hydroxyl groups.

In one embodiment, the present disclosure provides a thermosetting polymeric composition obtained by a reaction of a mixture comprising an epoxy and a tannin, wherein the epoxy material is 60-80% by weight, and the tannin is 20-40% by weight.

In one embodiment, the present disclosure provides a thermosetting polymeric composition obtained by a reaction of a mixture comprising an epoxy and a tannin, wherein the tannin is also functioned as a hardening agent and a cross-linking agent.

In one embodiment, the present disclosure provides a thermosetting polymeric composition obtained by a reaction of a mixture comprising an epoxy and a tannin, wherein the reaction is heated at a temperature between 100-180° C.

In one embodiment, the present disclosure provides a thermosetting polymeric composition obtained by a reaction of a mixture comprising an epoxy and a tannin, wherein the thermosetting polymeric composition is cured at a temperature between 130-180° C.

In one embodiment, the present disclosure provides a method of preparing any thermosetting polymeric composition of the present disclosure, wherein the method comprising:
a) heating the epoxy material and the tannin at a temperature between 100-180° C. until a substantially homogeneous solution is obtained; and
b) curing the substantially homogeneous solution between 130-180° C. until the solution is hardened.

Those skilled in the art will recognize that numerous modifications can be made to the specific implementations described above. The implementations should not be limited to the particular limitations described. Other implementations may be possible.

The invention claimed is:

1. A thermosetting polymeric composition, wherein the thermosetting polymeric composition comprises a reaction product of a mixture comprising:
  an epoxy material; and
  a tannin,
  wherein the thermosetting polymeric composition is a hardened polymeric material and is substantially homogenous,
  wherein the weight percentage of tannin is 3-50%, the epoxy material is 50-97% of the total weight of the epoxy material and the tannin,
  wherein the thermosetting polymeric composition has a glass transition temperature of at least 160° C.

2. The thermosetting polymeric composition of claim 1, wherein the thermosetting polymeric composition is substantially free of visible clumps.

3. The thermosetting polymeric composition of claim 1, wherein the epoxy material is selected from the group consisting of epoxy-containing polyethers, epoxy-containing polyesters, epoxy-containing polyurethanes, epoxy-containing acrylics, and any combination thereof.

4. The thermosetting polymeric composition of claim 3, wherein the epoxy material comprises a polyepoxide.

5. The thermosetting polymeric composition of claim 4, wherein the epoxy material comprises Diglycidylether Bisphenol A (DGEBA).

6. The thermosetting polymeric composition of claim 1, wherein the tannin has a structure comprises at least a gallic acid unit and at least one terminal phenolic hydroxyl groups.

7. The thermosetting polymeric composition of claim 1, wherein the thermosetting polymeric composition has a thermal degradation temperature of at least 400° C.

8. The thermosetting polymeric composition of claim 1, wherein the epoxy material is 60-80% by weight, and the tannin is 20-40% by weight.

9. The thermosetting polymeric composition of claim 1, wherein the tannin is also functioned as a hardening agent and a crosslinking agent.

10. The thermosetting polymeric composition of claim 1, wherein the reaction is heated at temperature between 100-180° C.

11. The thermosetting polymeric composition of claim 1, wherein the thermosetting polymeric composition is cured at a temperature between 130-180° C.

12. A method of preparing the thermosetting polymeric composition of claim 1, wherein the method comprising:
 a) heating the epoxy material and the tannin at a temperature between 100-180° C. until a substantially homogeneous solution is obtained; and
 b) curing the substantially homogeneous solution between 130-180° C. until the solution is hardened.

* * * * *